United States Patent
Song

(10) Patent No.: US 8,096,933 B2
(45) Date of Patent: Jan. 17, 2012

(54) CENTRIFUGE USED FOR LIQUID SEPARATION

(76) Inventor: Shujiang Song, Guangdong (CN)

( * ) Notice: Subject to any disclaimer, the term of this patent is extended or adjusted under 35 U.S.C. 154(b) by 880 days.

(21) Appl. No.: 12/158,337

(22) PCT Filed: Oct. 20, 2006

(86) PCT No.: PCT/CN2006/002812
§ 371 (c)(1),
(2), (4) Date: Jun. 20, 2008

(87) PCT Pub. No.: WO2008/037125
PCT Pub. Date: Apr. 3, 2008

(65) Prior Publication Data
US 2009/0005230 A1 Jan. 1, 2009

(30) Foreign Application Priority Data
Sep. 7, 2006 (CN) .......................... 2006 1 0153206

(51) Int. Cl.
*B04B 1/10* (2006.01)
*B04B 7/04* (2006.01)
(52) U.S. Cl. ................ 494/34; 494/41; 494/56; 494/60; 494/65; 494/74
(58) Field of Classification Search ............ 494/22, 494/34, 38, 41, 43, 44, 56, 60, 65, 74, 79; 210/360.1, 380.1
See application file for complete search history.

(56) References Cited

U.S. PATENT DOCUMENTS

| | | | | | |
|---|---|---|---|---|---|
| 5,788,621 | A | * | 8/1998 | Eady | 494/37 |
| 6,068,587 | A | * | 5/2000 | Huang | 494/48 |
| 6,238,329 | B1 | * | 5/2001 | Rogers | 494/22 |
| 6,398,706 | B1 | * | 6/2002 | Huang | 494/48 |
| 6,440,054 | B1 | * | 8/2002 | Galik | 494/22 |
| 8,020,498 | B2 | * | 9/2011 | Cavaliere et al. | 494/34 |
| 2009/0005230 | A1 | * | 1/2009 | Song | 494/3 |

FOREIGN PATENT DOCUMENTS

JP 05317753 A * 12/1993
WO 2005/108037 A1 * 11/2005

* cited by examiner

*Primary Examiner* — Charles E Cooley
(74) *Attorney, Agent, or Firm* — Pearne & Gordon LLP

(57) ABSTRACT

A centrifuge with an electric motor (46), composed of a centrifuge outer frame (47), a heavy liquid collecting tank (18), a lower hollow shaft (22), centrifugal units, an upper hollow shaft (38), and a light liquid collecting tank (41). The heavy liquid collecting tank, the lower hollow shaft, the upper hollow shaft, and the light liquid collecting tank are all fixed to the centrifuge outer frame, the centrifugal units are fixed between the upper hollow shaft and the lower hollow shaft, the motor is connected to the upper hollow shaft and drives the upper hollow shaft to rotate, the upper hollow shaft is fixed to two or more centrifugal units connected in series and drives the centrifugal units to rotate, a hollow portion of the upper hollow shaft communicates with the light liquid collecting tank, centrifugal units are fixed to the lower hollow shaft and drive the lower hollow shaft to rotate, the heavy liquid collecting tank is a casing formed between the centrifuge outer frame and the centrifugal units. The centrifugal of the present invention is simple in structure, small in volume, low in power consumption, thorough in separation, convenient in operation, and high in practicability.

10 Claims, 10 Drawing Sheets

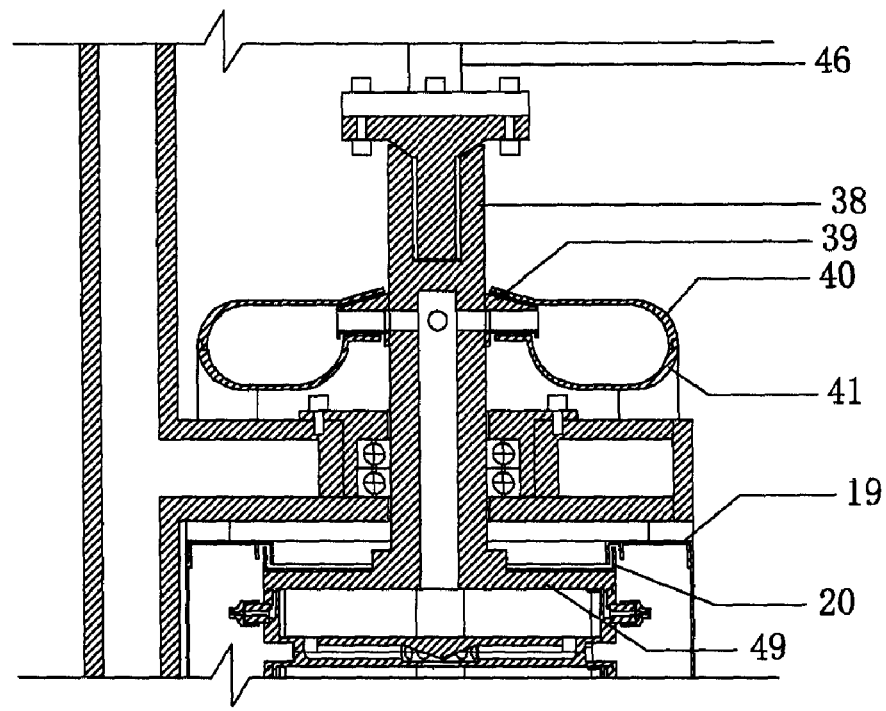
FIG. 8-1
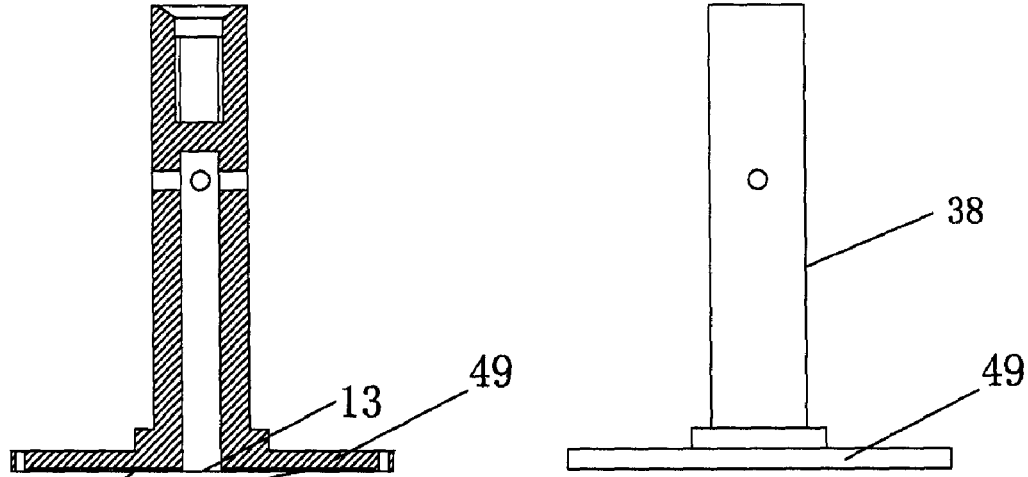
FIG. 8-2
FIG. 8-3
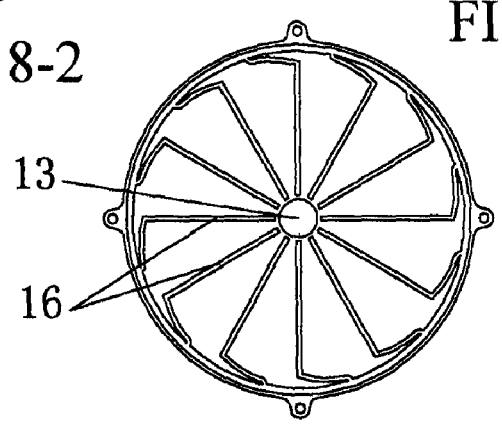
FIG. 8-4

CENTRIFUGE USED FOR LIQUID SEPARATION

FIELD OF INVENTION

The present invention relates to a centrifuge, in particular, to a centrifuge used for liquid separation.

BACKGROUND OF THE INVENTION

Nowadays, with the booming economy, most countries in the world are facing a common problem of freshwater shortage. Although two thirds of the earth surface is covered by water, 97% of the water storage is seawater and bitter salty water. Among the rest 2.53% of freshwater, 77% is distributed on the two poles of the earth and mountain glaciers, so the amount of freshwater directly available for human use is less than 0.7% of the water storage on the earth.

Water in substance form is rich on the earth, such as seawater. If the seawater can be converted into freshwater through separation, the problem of water shortage can be completely solved. Recently, more than 120 countries and areas in the world acquire freshwater by desalting seawater or bitter salty water.

Currently, seawater desalination techniques adopted worldwide are thermal and membrane methods, also known as distillation and reverse-osmosis processes. The corresponding liquid separating devices are distillation separating device and reverse-osmosis separating device respectively.

1. Distillation Separating Device:

i. Multi-stage flash (MSF) device: with an operating temperature, a gain output ratio (GOR), and a stage of 120° C., 10, and 40 respectively. In addition to a certain amount of heating steam, the MSF device also consumes an electric power of 4 KWh to 5 KWh per 1 $m^3$ of freshwater for seawater circulation and liquid transportation, so the power consumption is large.

ii. Low temperature multi-effect (LT-MDE) device: performing distillation on the basis of multi-effects, with a temperature lower than 80° C., the number of effects around 12, and a GOR higher than 10. In addition to a certain amount of heating steam, the LT-MDE device also consumes an electric power of 1.8 KWh/$m^3$ for liquid transportation, so the top two factors affecting the cost are the steam and then the power consumption, and the cost is high.

2. Reverse-Osmosis Separating Device:

The reverse-osmosis separating device is designed to force the seawater into a reverse-osmosis membrane by a certain pressure (60 kg/$cm^2$). The membrane of this device only allows water molecules in the seawater to pass, and holds back most of the salt molecules, thus obtaining the freshwater.

The reverse-osmosis separating device consumes an electric power of 3 KWh to 4 KWh per 1 $m^3$ of freshwater, and the top two factors affecting the cost are the power consumption and expenses for replacing the medicament and membrane, so the manufacturing cost and use fee are high.

In view of the above, the separating devices in the aforementioned methods all have a complicated structure, large space occupation, high power consumption, and great electric power charge. Therefore, those defects should be eliminated.

SUMMARY OF THE INVENTION

Accordingly, the present invention is directed to a centrifuge to overcome the defects in the conventional art and achieve sufficient liquid separation. The device of the present invention is simple in structure, small in volume, low in power consumption, and capable of operating with very low power charge. Besides, the device is also thorough in separation, convenient in operation, and high in practicability.

The technical scheme of the present invention is illustrated as follows.

A centrifuge with an electric motor is composed of a centrifuge outer frame, a heavy liquid collecting tank, a lower hollow shaft, centrifugal units, an upper hollow shaft, and a light liquid collecting tank. The heavy liquid collecting tank, the lower hollow shaft, the upper hollow shaft, and the light liquid collecting tank are all fixed to the centrifuge outer frame. The centrifugal units are fixed between the upper hollow shaft and the lower hollow shaft. The motor is connected to the upper hollow shaft and drives the upper hollow shaft to rotate. The upper hollow shaft is fixed to two or more centrifugal units connected in series and drives the centrifugal units to rotate. A hollow portion of the upper hollow shaft communicates with the light liquid collecting tank. Two or more centrifugal units connected in series are fixed to the lower hollow shaft and drive the lower hollow shaft to rotate. The heavy liquid collecting tank is a casing formed between the centrifuge outer frame and the centrifugal units. The heavy liquid collecting tank is fixed to the centrifuge outer frame and is sealed by seal strips and the centrifugal units.

In the above structure of the present invention, each of the centrifugal units includes a centrifugal chamber casing, a centrifugal chamber cover, and a plurality of heavy liquid flow-limiting valves. The centrifugal chamber casing is connected to the centrifugal chamber cover to form an independent hollow chamber, and the centrifugal chamber casing is formed with the heavy liquid flow-limiting valves.

In the above structure of the present invention, the centrifugal chamber is constituted by a plurality of sequential cavities enclosed by the centrifugal chamber casing, a plurality of centripetal plates, and a plurality of heavy liquid guide blades. The centripetal plates and the heavy liquid guide blades divide the centrifugal chamber into three or more equivalent portions through the circle center. Each portion is called a "stage", and the number of the cavities in the centrifugal chamber is three or above.

In the above structure of the present invention, each "stage" includes a separating chamber, a heavy liquid chamber, a separating guide hole, and a heavy liquid guide outlet.

In the above structure of the present invention, a light liquid chamber covering an area from one end of the centripetal plate near the circle center to the circle center is connected to a light liquid guide outlet on the centrifugal chamber cover. The light liquid guide outlet is connected to a divider chamber of the previous centrifugal unit. The divider chamber communicates with a divided manifold. The divided manifold communicates with the separating guide hole of the previous centrifugal unit. The light liquid chamber is a cylindrical chamber communicating with the plurality of separating chambers formed by the plurality of centripetal plates. The separating guide hole is located at two thirds on the right side of the left centripetal plate of each separating chamber seen from the circle center to the circumference, and "two thirds" refers to two thirds of the length of the centripetal plate. An outmost end of the centripetal plate of the separating chamber has an opening connected to the heavy liquid chamber. The heavy liquid chamber communicates with the heavy liquid guide outlet, and the heavy liquid guide outlet is connected to the heavy liquid flow-limiting valve.

In the above structure of the present invention, a seal tank on the centrifugal chamber cover is combined with the top of the centrifugal chamber casing, the top of the heavy liquid guide blade, and the top of the centripetal plate to seal the centrifugal chamber, and make the light liquid chamber, the separating chamber, and the heavy liquid chamber relatively independent and communicate with each other.

In the above structure of the present invention, each heavy liquid flow-limiting valve is connected to the corresponding heavy liquid guide outlet. In order to make sure the liquid thrown out is of a high concentration, the heavy liquid flow-limiting valve only allows a certain amount of high concentration liquid to be thrown out.

In the above structure of the present invention, the lower hollow shaft is of a hollow structure having a hollow portion in communication with a mechanical seal chamber, and the casing of the mechanical seal chamber is formed with a guide outlet.

In the above structure of the present invention, the top of the heavy liquid collecting tank is sealed by an upper seal cover of the heavy liquid collecting tank and an upper movable seal strip together with the centrifugal unit, and the bottom is sealed by a lower movable seal strip with the centrifugal unit.

In the above structure of the present invention, the upper hollow shaft is of a hollow structure with a lower chassis connected to the centrifugal chamber casing to form a unit, i.e., the top centrifugal unit. The lower chassis of the upper hollow shaft is formed with a light liquid guide outlet at the circle center, and the light liquid guide outlet communicates with the light liquid collecting tank. The light liquid reaching a certain purity first flows into the upper hollow shaft through the light liquid guide outlet at the circle center of the lower chassis of the upper hollow shaft, then enters a flywheel through a light liquid pour hole on the top of the upper hollow shaft, and is thereafter thrown into the light liquid collecting tank and discharged sequentially.

In the above structure of the present invention, the operating principle of the centrifuge is described as follows. A mixed liquid of a certain pressure first flows into the mechanical seal chamber through a mixed liquid guide outlet on the water seal casing, then enters the lower hollow shaft in high-speed rotation from the mechanical seal chamber, and further enters a divider chamber located between an upper chassis of the lower hollow shaft and a bottom plate of the first centrifugal unit through a liquid inlet on the upper chassis of the lower hollow shaft. After being divided, the liquid further enters a divided manifold between the upper chassis of the lower hollow shaft and the bottom plate of the first centrifugal unit, and is guided by the divided manifold into each separating chamber of the first centrifugal unit. Under the high-speed rotation of the centrifuge, the solvency in the mixed liquid infiltrates toward the heavy liquid chamber, and thus the mixed liquid in the heavy liquid chamber has a higher concentration than the liquid in the separating chamber. After that, the mixed liquid enters the heavy liquid flow-limiting valve through the heavy liquid guide outlet, and a certain amount of the high concentration heavy liquid is thrown out of the centrifuge. Meanwhile, as the mixed liquid continuously enters the separating chamber through the mixed liquid guide outlet, the relatively light liquid in the separating chamber is pressed into the light liquid chamber, then enters the divider chamber on the centrifugal cover through the light liquid guide outlet on the centrifugal chamber cover, and flows into the previous centrifugal unit through the divided manifold. By repeating the above process, the liquid is purified through the plurality of centrifugal units to reach the demanded purity. The lower chassis of the upper hollow shaft serves as the centrifugal chamber cover of the first centrifugal chamber, and forms the top centrifugal unit together with the top centrifugal chamber casing. The light liquid reaching the demanded purity enters the upper hollow shaft through the light liquid guide outlet at the circle center of the lower chassis of the upper hollow shaft, then enters a flywheel through a light liquid pour hole on the top of the upper hollow shaft, and is thereafter thrown into the light liquid collecting tank and discharged sequentially. In this manner, the light liquid achieves the demanded purity, and the heavy liquid reaches the required concentration.

In the above structure of the present invention, the centrifugal principle is adopted to separate the solvency from the seawater mixed liquid in the form of a saturated or supersaturated liquid, so as to purify the solvency in the liquid. Thus, the present invention can be regarded as a centrifuge for liquid-liquid separation adopted to overcome the defects in the conventional art and to achieve sufficient liquid separation. The device of the present invention is simple in structure, small in volume, low in power consumption, and capable of operating with very low power charge. Besides, the device is also thorough in separation, convenient in operation, and high in practicability.

Besides seawater desalination, the device of the present invention is also applicable to technical fields such as chemical, medical, environmental protection, and food industry.

BRIEF DESCRIPTION OF THE DRAWINGS

The present invention will become more fully understood from the detailed description given herein below for illustration only, and thus are not limitative of the present invention, and wherein:

FIG. 2-1 is a cross-sectional view of FIG. 2-2;

FIG. 2-3 is a top view of FIG. 2-1;

FIG. 2-4 is a bottom view of FIG. 2-1;

FIG. 3-2 is a schematic view illustrating an assembled structure of a plurality of centrifugal units overlapping each other according to the present invention;

FIG. 3-1 is a cross-sectional view of FIG. 3-2;

FIG. 4-1 is a schematic view of a six-stage centrifugal chamber according to the present invention;

FIG. 4-2 is a schematic view of an eight-stage centrifugal chamber according to the present invention;

FIG. 4-3 is a schematic view of a twelve-stage centrifugal chamber according to the present invention;

FIG. 4-4 is a schematic view of a seven-stage centrifugal chamber according to the present invention;

FIG. 4-5 is a schematic view of a nine-stage centrifugal chamber according to the present invention;

FIG. 4-6 is a schematic view of a thirteen-stage centrifugal chamber according to the present invention;

FIG. 5-2 is a view from one side of the twelve-stage centrifugal chamber according to the present invention;

FIG. 5-1 is a cross-sectional view of FIG. 5.2;

FIG. 5-3 is a top view of FIG. 5-1;

FIG. 5-4 is a bottom view of FIG. 5-1;

FIG. 6-2 is a view from one side of a centrifugal chamber cover according to the present invention;

FIG. 6-1 is a cross-sectional view of FIG. 6.2;

FIG. 6-3 is a top view of FIG. 6-1;

FIG. 6-4 is a bottom view of FIG. 6-1;

FIG. 7-1 is a cross-sectional view of a centrifuge body with a lower hollow shaft;

FIG. 7-2 is a cross-sectional view of the lower hollow shaft separated from the centrifuge body;

FIG. 7-3 is an outside view of the lower hollow shaft in FIG. 7-2;

FIG. 7-4 is a top view of the lower hollow shaft in FIG. 7-2;

FIG. 8-1 is a cross-sectional view of a centrifuge body with an upper hollow shaft;

FIG. 8-2 is a cross-sectional view of the lower hollow shaft separated from the centrifuge body;

FIG. 8-3 is an outside view of the upper hollow shaft in FIG. 8-2;

FIG. 8-4 is a top view of the upper hollow shaft in FIG. 8-2;

DETAILED DESCRIPTION OF THE INVENTION

Figure 1:
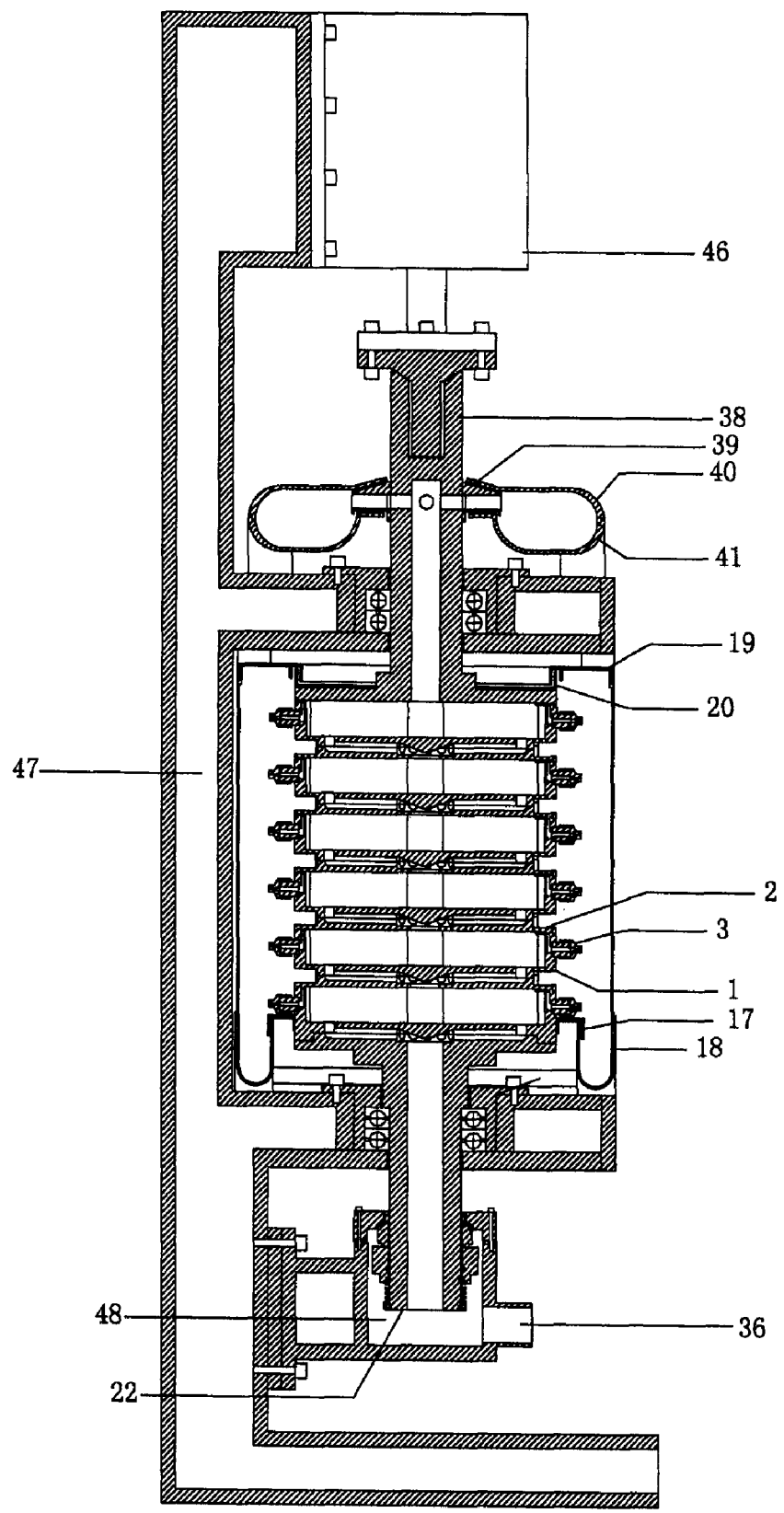
FIG. 1 is an overall longitudinal sectional view of a centrifuge according to the present invention.
Figures 1, 2:
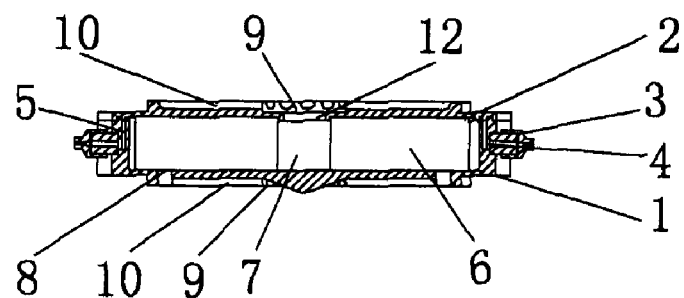
FIG. 2-2 is a view from one side of a centrifugal unit according to the present invention.
Figure 2:
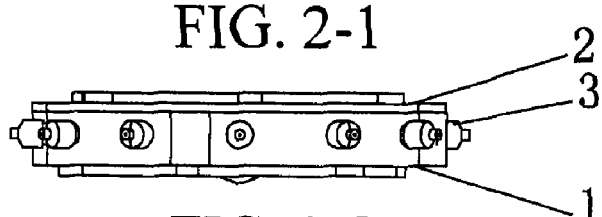
Figures 2, 3:
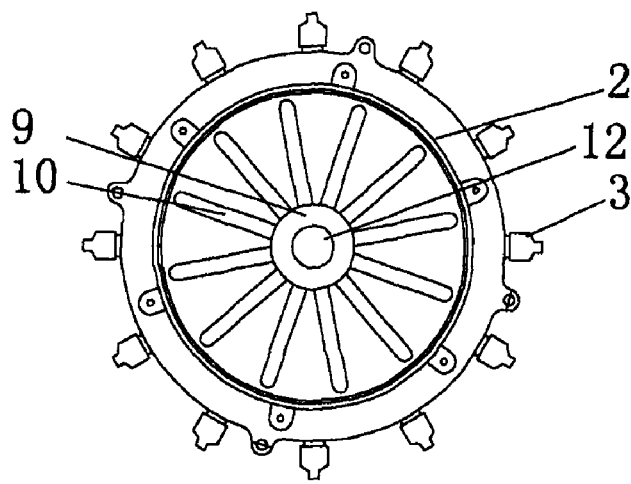
Figures 2, 3, 4:
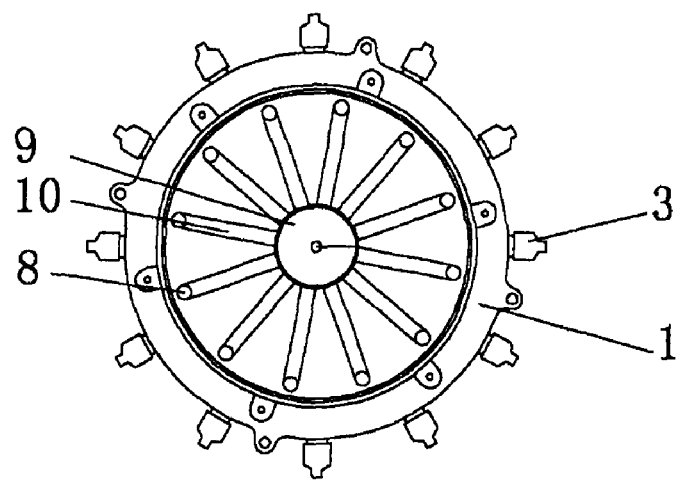
Figures 1, 3:
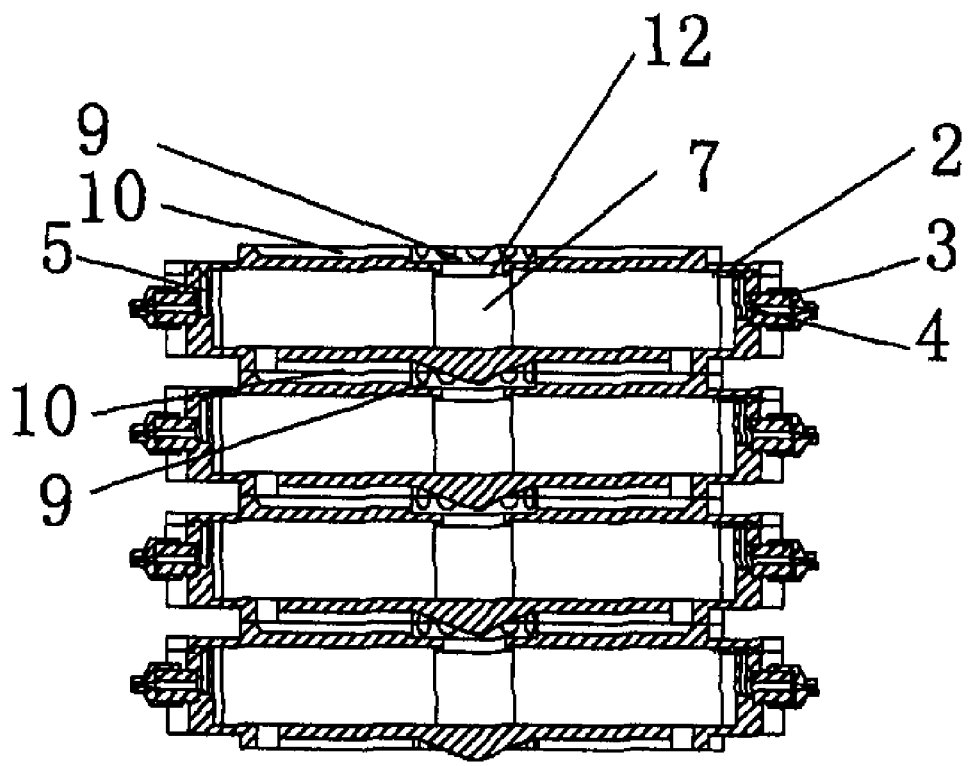
Figures 2, 3:
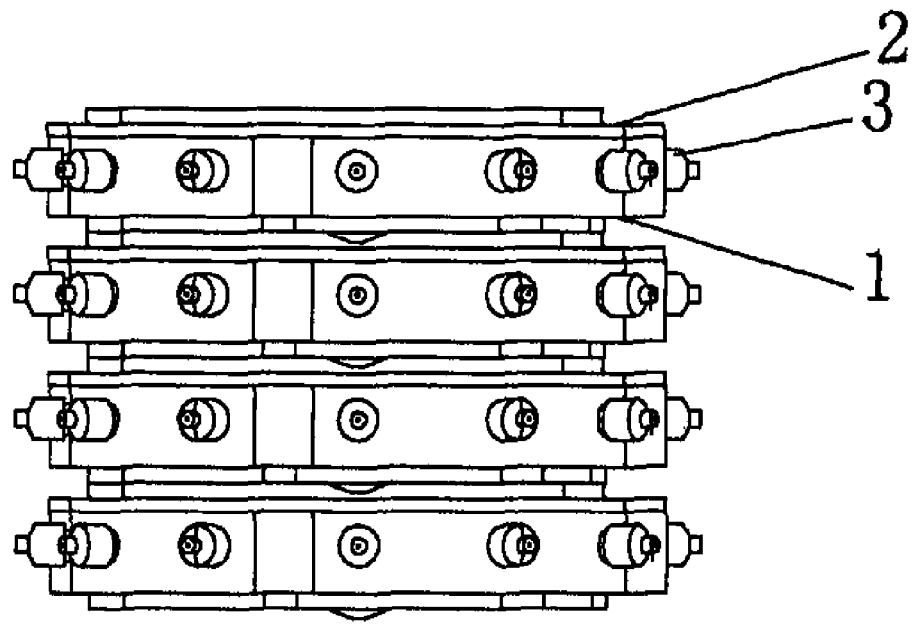
Figures 1, 4:
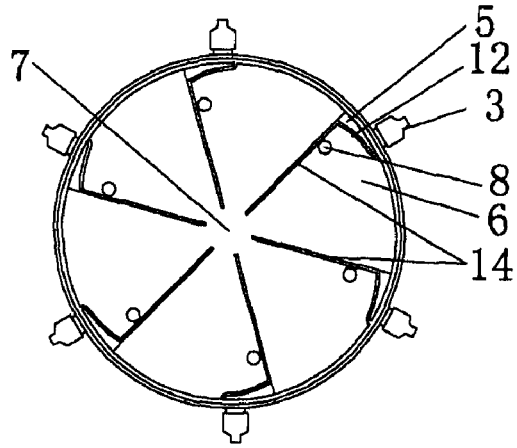
Figure 4:
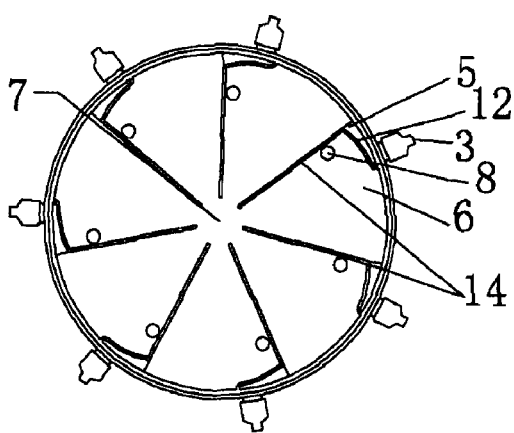
Figures 2, 4:
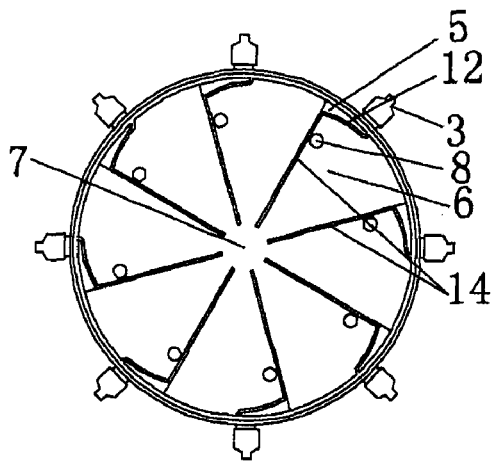
Figures 4, 5:
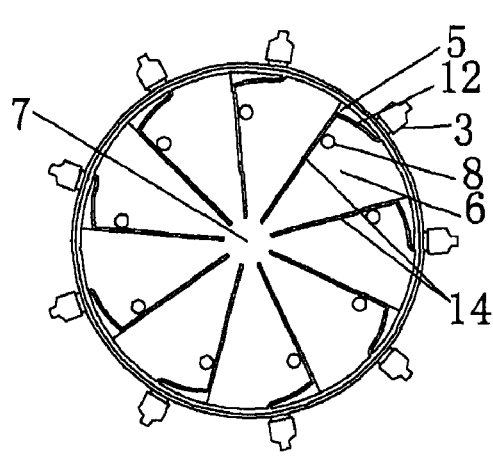
Figures 3, 4:
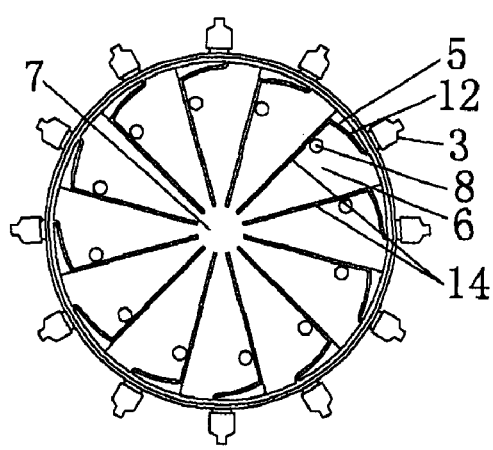
Figures 4, 5, 6:
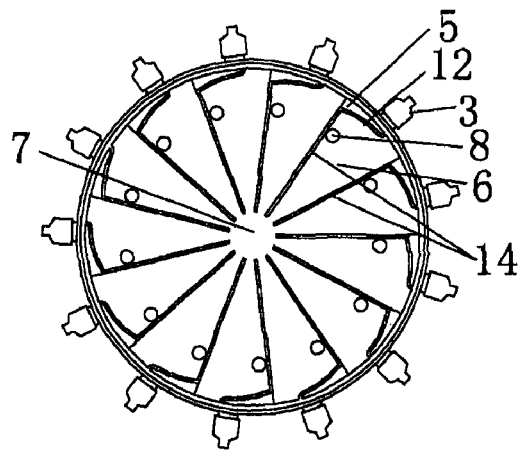
Figures 1, 5:
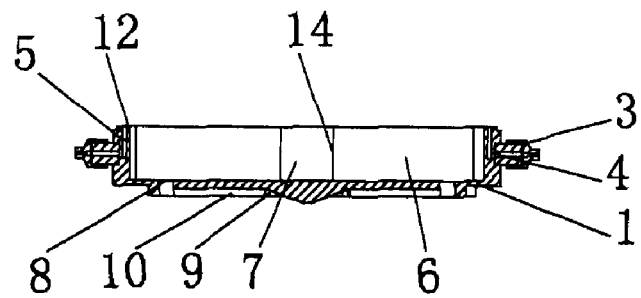
Figures 2, 5:
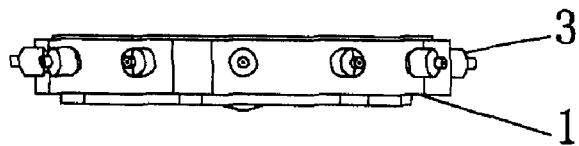
Figures 3, 5:
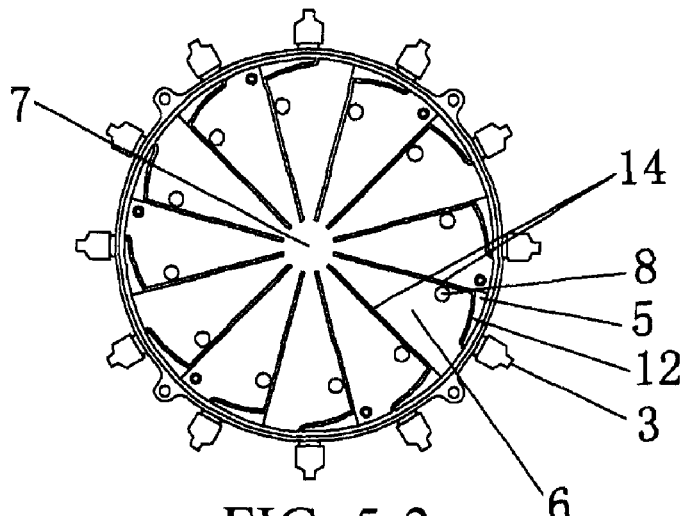
Figures 4, 5:
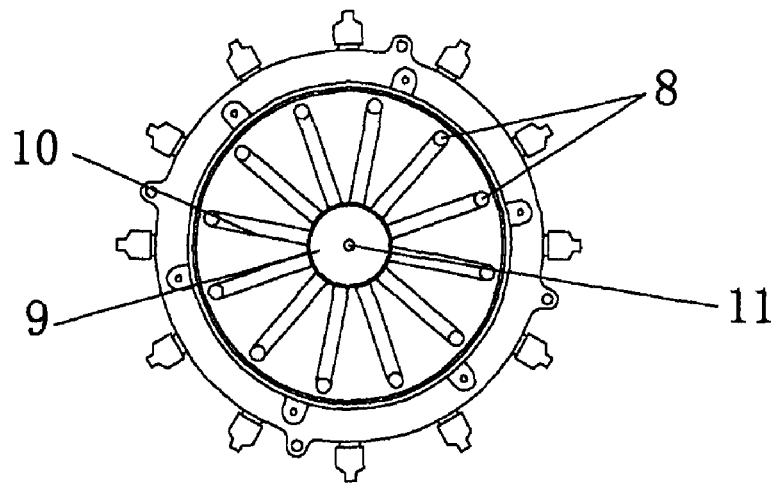
Figures 1, 6:
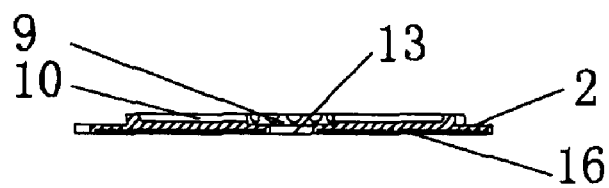
Figures 2, 6:
Figures 3, 6:
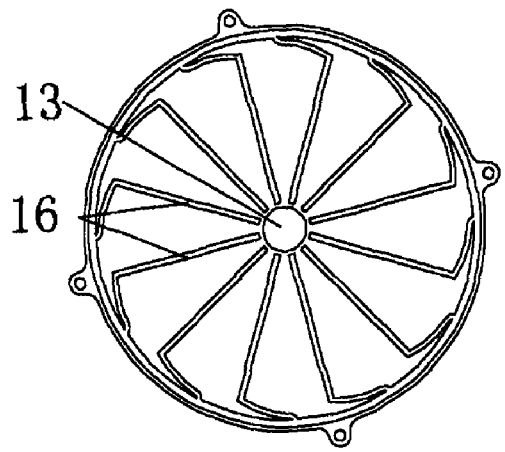
Figures 4, 6:
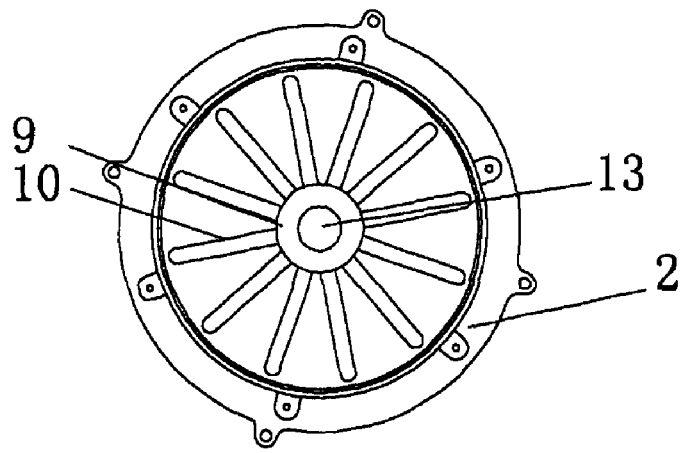
Figures 1, 2, 3, 4, 7:
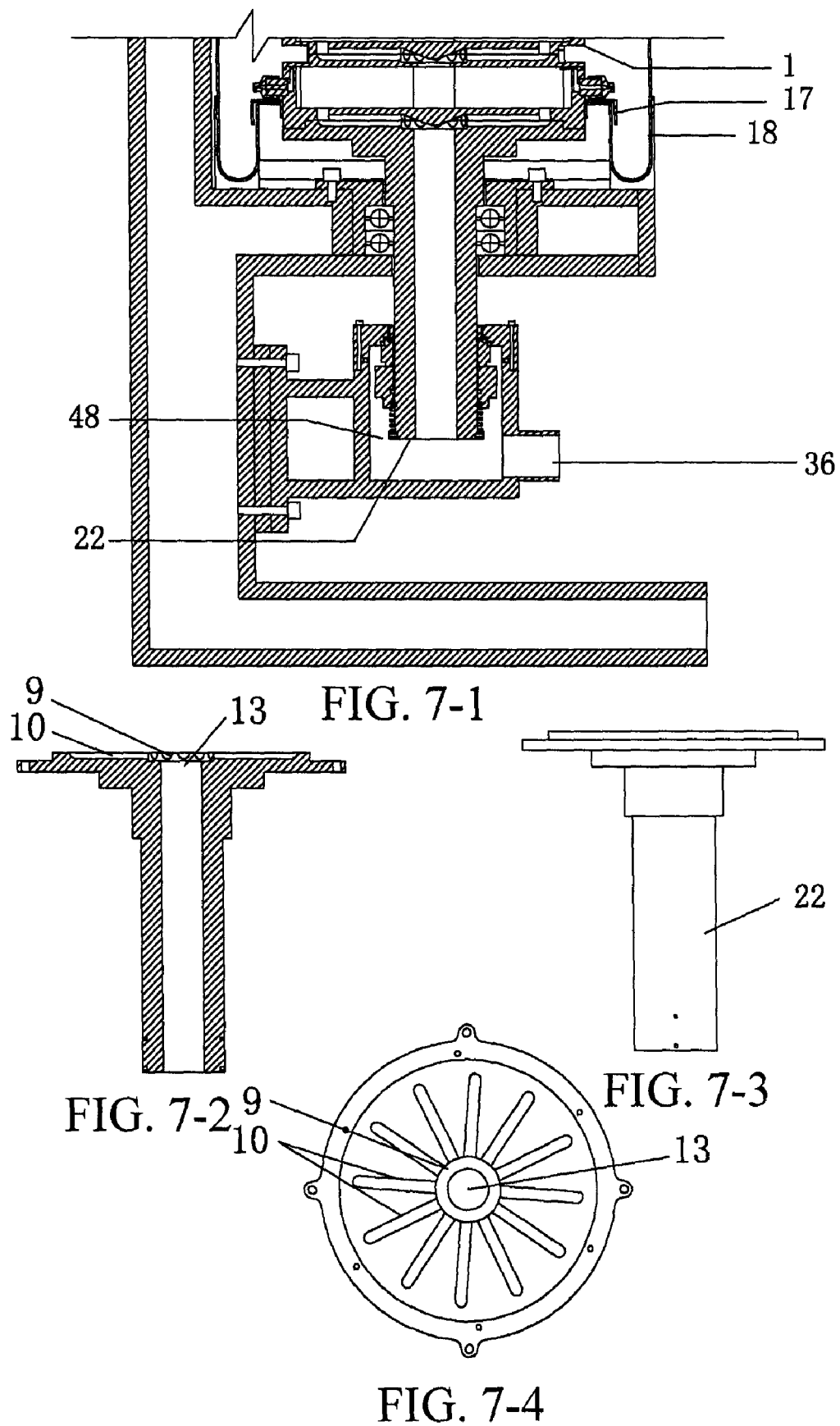
Figure 9:
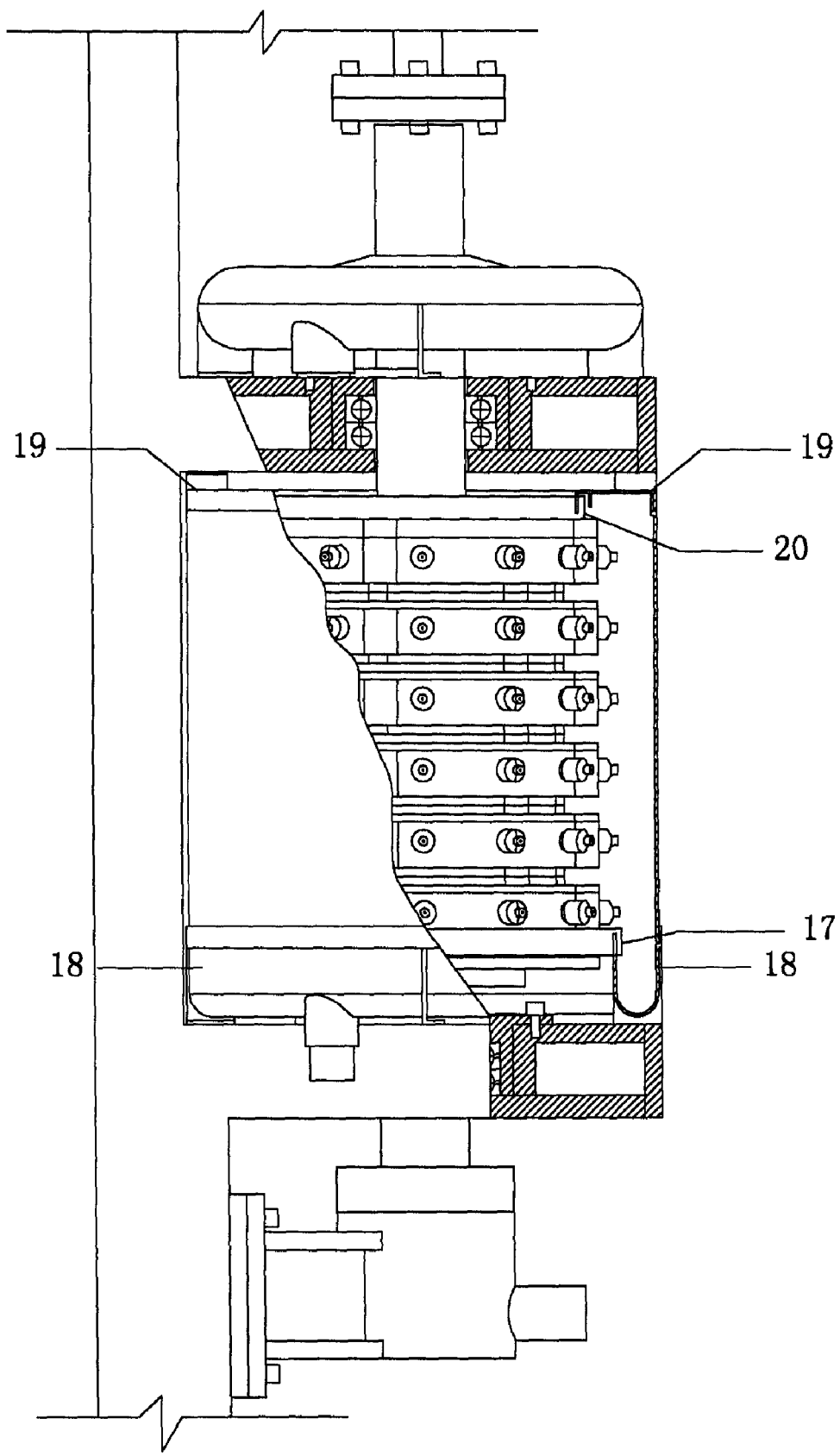
FIG. 9 is a cross-sectional view of a centrifuge body with a heavy liquid collecting tank.
Figure 10:
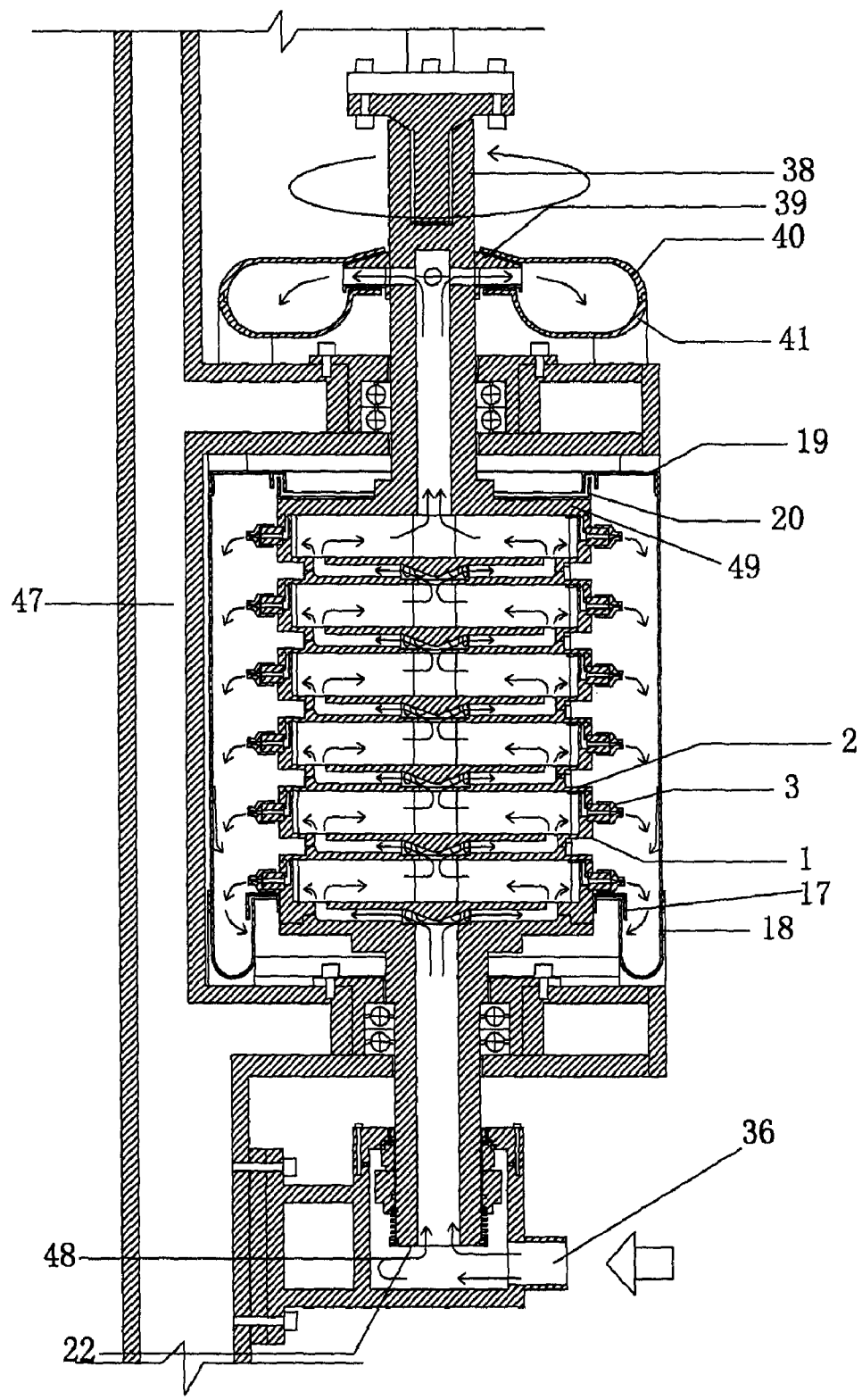
FIG. 10 is a schematic view illustrating the operating process of a centrifuge according to the present invention.

As shown in FIGS. 1 and 10, a centrifuge with an electric motor 46 is composed of a centrifuge outer frame 47, a heavy liquid collecting tank 18, a lower hollow shaft 22, centrifugal units, an upper hollow shaft 38, and a light liquid collecting tank 41. The heavy liquid collecting tank 18, the lower hollow shaft 22, the upper hollow shaft 38, and the light liquid collecting tank 41 are all fixed to the centrifuge outer frame 47. The centrifugal units are fixed between the upper hollow shaft 38 and the lower hollow shaft 22. The motor 46 is connected to the upper hollow shaft 38 and drives the upper hollow shaft 38 to rotate. The upper hollow shaft 38 is fixed to two or more centrifugal units connected in series and drives the centrifugal units to rotate. A hollow portion of the upper hollow shaft 38 communicates with the light liquid collecting tank 41. Two or more centrifugal units connected in series are fixed to the lower hollow shaft 22 and drive the lower hollow shaft 22 to rotate. The heavy liquid collecting tank 18 is a casing formed between the centrifuge outer frame 47 and the centrifugal units. The heavy liquid collecting tank 18 is fixed to the centrifuge outer frame 47 and is sealed by seal strips and the centrifugal units.

As shown in FIGS. 2-1, 2-2, 2-3, 2-4, 3-1, and 3-2, each of the centrifugal units includes a centrifugal chamber casing 1, a centrifugal chamber cover 2, and a plurality of heavy liquid flow-limiting valves 3. The centrifugal chamber casing 1 is connected to the centrifugal chamber cover 2 to form an independent hollow chamber, and the centrifugal chamber casing 1 is formed with the heavy liquid flow-limiting valves 3.

As shown in FIGS. 4-1, 4-2, 4-3, 4-4, 4-5, 4-6, 5-1, 5-2, 5-3, 5-4, 6-1, 6-2, 6-3, and 6-4, the centrifugal chamber is constituted by a plurality of sequential cavities enclosed by the centrifugal chamber casing 1, a plurality of centripetal plates 14, and a plurality of heavy liquid guide blades 12. The centripetal plates 14 and the heavy liquid guide blades 12 divide the centrifugal chamber into three or more equivalent portions through the circle center, each portion is called a "stage", and the number of the cavities in the centrifugal chamber is three or above.

Each "stage" includes a separating chamber 6, a heavy liquid chamber 5, a separating guide hole 8, and a heavy liquid guide outlet 4.

The light liquid chamber 7 covering an area from one end of the centripetal plate 14 near the circle center to the circle center is connected to a light liquid guide outlet 13 on the centrifugal chamber cover 2. The light liquid guide outlet 13 is connected to a divider chamber 9 of the previous centrifugal unit. The divider chamber 9 communicates with a divided manifold 10. The divided manifold 10 communicates with the separating guide hole 8 of the previous centrifugal unit. The light liquid chamber 7 is a cylindrical chamber communicating with the plurality of separating chambers 6 formed by the centripetal plates 14. The separating guide hole 8 is located at two thirds on the right side of the left centripetal plate 14 of each separating chamber seen from the circle center to the circumference, and "two thirds" refers to two thirds of the length of the centripetal plate. An outmost end of the centripetal plate 14 of the separating chamber 6 has an opening connected to the heavy liquid chamber 5. The heavy liquid chamber 5 communicates with the heavy liquid guide outlet 4, and the heavy liquid guide outlet 4 is connected to the heavy liquid flow-limiting valve 3.

As shown in FIGS. 6-1, 6-2, 6-3, and 6-4, a seal tank 16 on the centrifugal chamber cover 2 is combined with the top of the centrifugal chamber casing 1, the top of the heavy liquid guide blade 12, and the top of the centripetal plate 14 to seal the centrifugal chamber, and make the light liquid chamber 7, the separating chamber 6, and the heavy liquid chamber 5 relatively independent and communicate with each other.

As shown in FIGS. 5-1, 5-2, 5-3, and 5-4, each heavy liquid flow-limiting valve 3 is connected to the corresponding heavy liquid guide outlet 4. In order to make sure the liquid thrown out is of a high concentration, the heavy liquid flow-limiting valve 3 only allows a certain amount of high concentration liquid to be thrown out.

As shown in FIGS. 7-1, 7-2, 7-3, and 7-4, the lower hollow shaft 22 is of a hollow structure having a hollow portion in communication with a mechanical seal chamber 48, and the casing of the mechanical seal chamber is formed with a guide outlet 36.

As shown in FIGS. 1, 7-1, 8-1, and 9, the top of the heavy liquid collecting tank 18 is sealed by an upper seal cover 19 of the heavy liquid collecting tank and an upper movable seal strip 20 together with the centrifugal unit, and the bottom is sealed by a lower movable seal strip 17 with the centrifugal unit.

As shown in FIGS. 1, 8-1, 8-2, 8-3, 8-4, and 10, the upper hollow shaft 38 is of a hollow structure with a lower chassis 49 connected to the centrifugal chamber casing 1 to form a unit, i.e., the top centrifugal unit. The lower chassis 49 of the upper hollow shaft 38 is formed with a light liquid guide outlet 13 at the circle center, and the light liquid guide outlet 13 communicates with the light liquid collecting tank 41. The light liquid reaching a certain purity first flows into the upper hollow shaft 38 through the light liquid guide outlet 13 at the circle center of the lower chassis of the upper hollow shaft 38, then enters a flywheel 39 through a light liquid pour hole on the top of the upper hollow shaft 38, and is thereafter thrown into the light liquid collecting tank 41 and discharged sequentially.

What is claimed is:

1. A centrifuge with an electric motor (46), comprising a centrifuge outer frame (47), a heavy liquid collecting tank (18), a lower hollow shaft (22), two or more centrifugal units, an upper hollow shaft (38), and a light liquid collecting tank (41), wherein the heavy liquid collecting tank (18), the lower hollow shaft (22), the upper hollow shaft (38), and the light liquid collecting tank (41) are all fixed to the centrifuge outer frame (47), the centrifugal units are fixed between the upper hollow shaft (38) and the lower hollow shaft (22), a motor (46) is connected to the upper hollow shaft (38) and drives the upper hollow shaft (38) to rotate, the upper hollow shaft (38) is fixed to the two or more centrifugal units connected in series and drives the centrifugal units to rotate, a hollow portion of the upper hollow shaft (38) communicates with the light liquid collecting tank (41), the two or more centrifugal units connected in series are fixed to the lower hollow shaft

(22) and drive the lower hollow shaft (22) to rotate, the heavy liquid collecting tank (18) is a casing formed between the centrifuge outer frame (47) and the centrifugal units, and the heavy liquid collecting tank (18) is fixed to the centrifuge outer frame (47) and is sealed by seal strips and the centrifugal units.

2. The centrifuge according to claim 1, wherein each of the centrifugal units comprises a centrifugal chamber casing (1), a centrifugal chamber cover (2), and a plurality of heavy liquid flow-limiting valves (3), the centrifugal chamber casing (1) is connected to the centrifugal chamber cover (2) to form an independent hollow chamber, and the centrifugal chamber casing (1) is formed with the heavy liquid flow-limiting valves (3).

3. The centrifuge according to claim 2, wherein the centrifugal chamber comprises a plurality of sequential cavities enclosed by the centrifugal chamber casing (1), a plurality of centripetal plates (14), and a plurality of heavy liquid guide blades (12), the centripetal plates (14) and the heavy liquid guide blades (12) divide the centrifugal chamber into three or more equivalent portions through a circle center, each portion is called a "stage", and the number of the cavities in the centrifugal chamber is three or above.

4. The centrifuge according to claim 3, wherein each "stage" comprises a separating chamber (6), a heavy liquid chamber (5), a separating guide hole (8), and a heavy liquid guide outlet (4).

5. The centrifuge according to claim 4, wherein a light liquid chamber (7) covering an area from one end of the centripetal plate (14) near the circle center to the circle center is connected to a light liquid guide outlet (13) on the centrifugal chamber cover (2), the light liquid guide outlet (13) is connected to a divider chamber (9) of a previous centrifugal unit, the divider chamber (9) communicates with a divided manifold (10), the divided manifold (10) communicates with the separating guide hole (8) of the previous centrifugal unit, the light liquid chamber (7) is a cylindrical chamber communicating with the plurality of separating chambers (6) formed by the centripetal plates (14), the separating guide hole (8) is located at two thirds on the right side of a left centripetal plate (14) of each separating chamber seen from the circle center to the circumference, and "two thirds" refers to two thirds of the length of the centripetal plate, an outmost end of the centripetal plate (14) of the separating chamber (6) has an opening connected to the heavy liquid chamber (5), the heavy liquid chamber (5) communicates with the heavy liquid guide outlet (4), and the heavy liquid guide outlet (4) is connected to the heavy liquid flow-limiting valve (3).

6. The centrifuge according to claim 5, wherein a seal tank (16) on the centrifugal chamber cover (2) is combined with a top of the centrifugal chamber casing (1), a top of the heavy liquid guide blade (12), and a top of the centripetal plate (14) to seal the centrifugal chamber, and make the light liquid chamber (7), the separating chamber (6), and the heavy liquid chamber (5) relatively independent and communicate with each other.

7. The centrifuge according to claim 4, wherein each heavy liquid flow-limiting valve (3) is connected to the corresponding heavy liquid guide outlet (4).

8. The centrifuge according to claim 2, wherein the upper hollow shaft (38) is of a hollow structure with a lower chassis (49) connected to the centrifugal chamber casing (1) to form a top centrifugal unit, the lower chassis (49) of the upper hollow shaft (38) is formed with a light liquid guide outlet (13) at a circle center, and the light liquid guide outlet (13) communicates with the light liquid collecting tank (41).

9. The centrifuge according to claim 1, wherein the lower hollow shaft (22) is of a hollow structure having a hollow portion in communication with a mechanical seal chamber (48), and a casing of the mechanical seal chamber is formed with a guide outlet (36).

10. The centrifuge according to claim 1, wherein a top of the heavy liquid collecting tank (18) is sealed by an upper seal cover (19) of the heavy liquid collecting tank and an upper movable seal strip (20) together with the centrifugal unit, and a bottom is sealed by a lower movable seal strip (17) with the centrifugal unit.

\* \* \* \* \*